US011091097B1

(12) United States Patent
Woodward

(10) Patent No.: US 11,091,097 B1
(45) Date of Patent: Aug. 17, 2021

(54) RECONFIGURABLE SYSTEM FOR ADJUSTABLE SUPPORT STRUCTURE ANCHORED TO CUP HOLDER ONBOARD VEHICLE

(71) Applicant: Eugene Woodward, Randallstown, MD (US)

(72) Inventor: Eugene Woodward, Randallstown, MD (US)

( * ) Notice: Subject to any disclaimer, the term of this patent is extended or adjusted under 35 U.S.C. 154(b) by 0 days.

(21) Appl. No.: 16/390,777

(22) Filed: Apr. 22, 2019

Related U.S. Application Data

(60) Provisional application No. 62/660,514, filed on Apr. 20, 2018, provisional application No. 62/722,615, filed on Aug. 24, 2018.

(51) Int. Cl.
*A47K 1/08* (2006.01)
*B60R 7/04* (2006.01)
*B60R 11/00* (2006.01)

(52) U.S. Cl.
CPC ............. *B60R 7/04* (2013.01); *B60R 11/00* (2013.01); *B60R 2011/0075* (2013.01)

(58) Field of Classification Search
CPC . B60R 11/02; B60R 11/00; B60R 2011/0071; G06F 1/1632; G06F 3/016
See application file for complete search history.

(56) References Cited

U.S. PATENT DOCUMENTS

| | | | | |
|---|---|---|---|---|
| 6,062,518 A | * | 5/2000 | Etue | B60R 11/0241 224/542 |
| 6,827,318 B1 | * | 12/2004 | Hsu Li | B60R 11/00 224/558 |
| 7,140,586 B2 | * | 11/2006 | Seil | B60R 11/00 248/311.2 |
| 7,954,773 B2 | * | 6/2011 | Carnevali | B60N 3/103 248/160 |
| 9,623,940 B1 | * | 4/2017 | Robichaux, Jr. | B63B 25/002 |
| 2019/0184907 A1 | * | 6/2019 | Weintraub | B60N 3/108 |

* cited by examiner

*Primary Examiner* — Amy J. Sterling
(74) *Attorney, Agent, or Firm* — Rosenberg, Klein & Lee

(57) ABSTRACT

A reconfigurable system provides for adjustable support of a personal article of a user in a manner releasably anchored to a built in cup holder receptacle onboard a vehicle. A base portion fits within and substantially fills the cup holder receptacle. The base portion defines an internal bore formed to extending axially therein. A frame portion engages the internal bore of the base portion to extend longitudinally upward therefrom. The frame portion includes at least first and second sections telescopically coupled to one another for axial relative displacement in releasably locked manner. The first and second sections are mutually locked against angular displacement relative to one another during use, with one of the first and second sections defining an attachment end. One of a plurality of modular holder portions is coupled to the attachment end of the frame portion to define a support surface for the personal article.

14 Claims, 11 Drawing Sheets

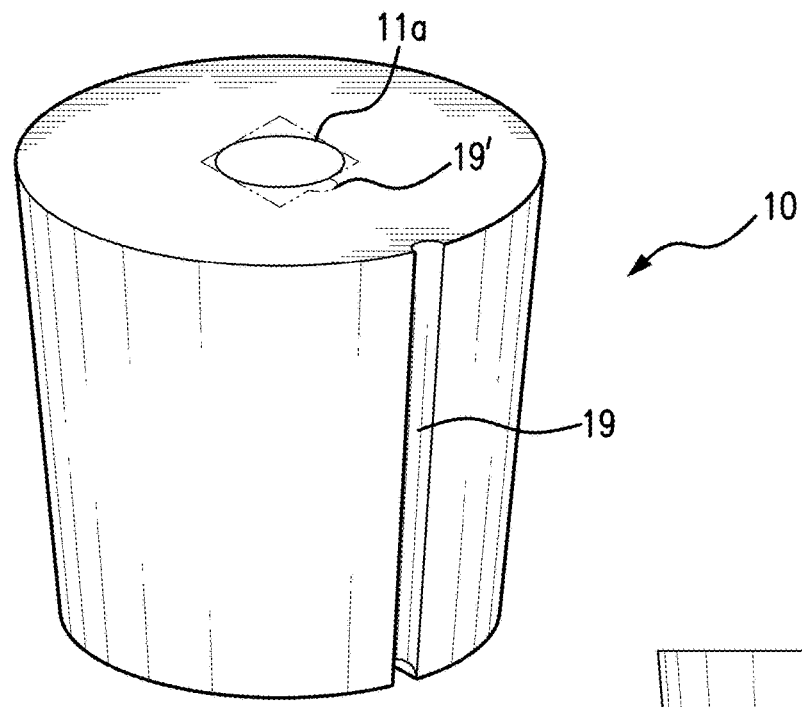
FIG. 7A
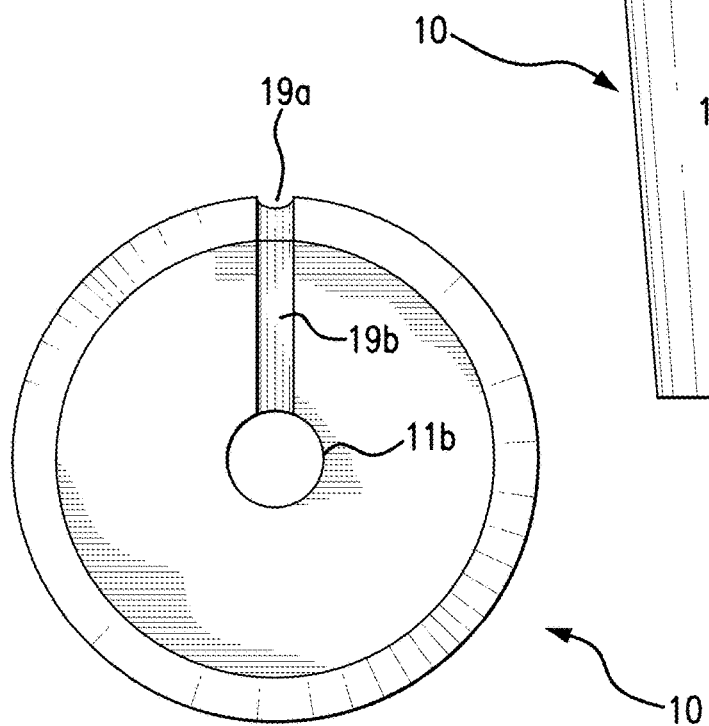
FIG. 7B
FIG. 7C

RECONFIGURABLE SYSTEM FOR ADJUSTABLE SUPPORT STRUCTURE ANCHORED TO CUP HOLDER ONBOARD VEHICLE

RELATED PATENTS AND APPLICATIONS

This Application is based on U.S. Provisional patent Application No. 62/660,514, filed on Apr. 20, 2018, and also based on U.S. Provisional patent Application No. 62/722,615, filed on Aug. 24, 2018. Both Provisional Applications are incorporated herein by reference.

BACKGROUND OF THE INVENTION

The subject system is generally directed to a system having modular components by which to simply yet securely, adjustably, and adaptively support or store loose articles, particularly in a vehicle. The system generally provides for convenient but stable support of a mobile telephone, other personal communication device, laptop computer, notepad, food, coins, loose personal items, and/or any other such articles that an operator or passenger of a vehicle may wish to safely access while occupying the vehicle, even while the vehicle is moving. The system is adaptable for use in an automobile, water vessel, aircraft, or any other vehicle known in the art having a recessed receptacle feature (such as a cup holder structure) available on or coupled to a console or other fixture of the vessel.

Drivers and passengers of road vehicles carrying personal articles on their person, such as mobile phones or other personal communication devices, often find that they have no reasonably secure yet readily accessible place within easy reach to put them. As a result, personal devices are often set down clumsily inside a cup holder typically built into a vehicle fixture such as an instrument/storage console or the like. Though these cup holders are often ill-fitting and not very secure or stable for stowing such personal devices, many occupants of vehicles often find that to be the only place readily available. Because of the awkward disposition of the device and its precarious orientation when stowed that way, users typically find it difficult to view and make proper use of the device when so awkwardly placed there. Alternatively, personal devices are often placed on an unoccupied seating or dashboard surface. But that option is fraught with drawbacks and hazards—both to the device and to the occupant—as the device may be thrown from or scattered loosely all over the surface due to vehicle motion.

Known measures are available whereby a mobile phone device is held on an assembly that is suspended by suction-attachment to the vehicle's front windshield or other window surface. Typically, a substantial holder assembly is equipped with one or more suction cups that stick to a dashboard or windshield surface. But that option is also fraught with potential hazards. One unavoidable safety hazard is that the assembly partially obstructs the vehicle operator's all-important field of view. Additionally, suction cups do not always attach themselves to a surface securely, and risk dislodging during rough travel.

SUMMARY OF THE INVENTION

Various objects are attained in a reconfigurable system formed in accordance with an embodiment of the present invention, which provides for adjustable support of a personal article of a user in a manner releasably anchored to a built in cup holder receptacle onboard a vehicle. The system includes a base portion configured to fit within and substantially fill the cup holder receptacle, the base portion having an outer surface for engaging an inner surface of the cup holder receptacle. The base portion is formed with an internal bore extending axially therein from an upper opening. A frame portion engages the internal bore of the base portion to extend longitudinally upward therefrom, the frame portion having at least first and second sections telescopically coupled to one another for axial relative displacement in releasably locked manner. The first and second sections are mutually locked against angular displacement relative to one another during use, with one of the first and second sections defining an attachment end. A holder portion is coupled to the attachment end of the frame portion. The holder portion defines a support surface for the personal article, and is selected from a plurality of modular holder structures having different structural configurations for holding personal articles of different type.

BRIEF DESCRIPTION OF THE DRAWINGS

FIG. 7A is a perspective view of a reconfigurable support structure having a cable groove, in accordance with an exemplary embodiment of the present invention;

FIG. 7B is a side view of the reconfigurable support structure of FIG. 7A, in accordance with an exemplary embodiment of the present invention;

FIG. 7C is a bottom view of the reconfigurable support structure of FIG. 7A, in accordance with an exemplary embodiment of the present invention.

DETAILED DESCRIPTION OF THE PREFERRED EMBODIMENTS

Figure 1:
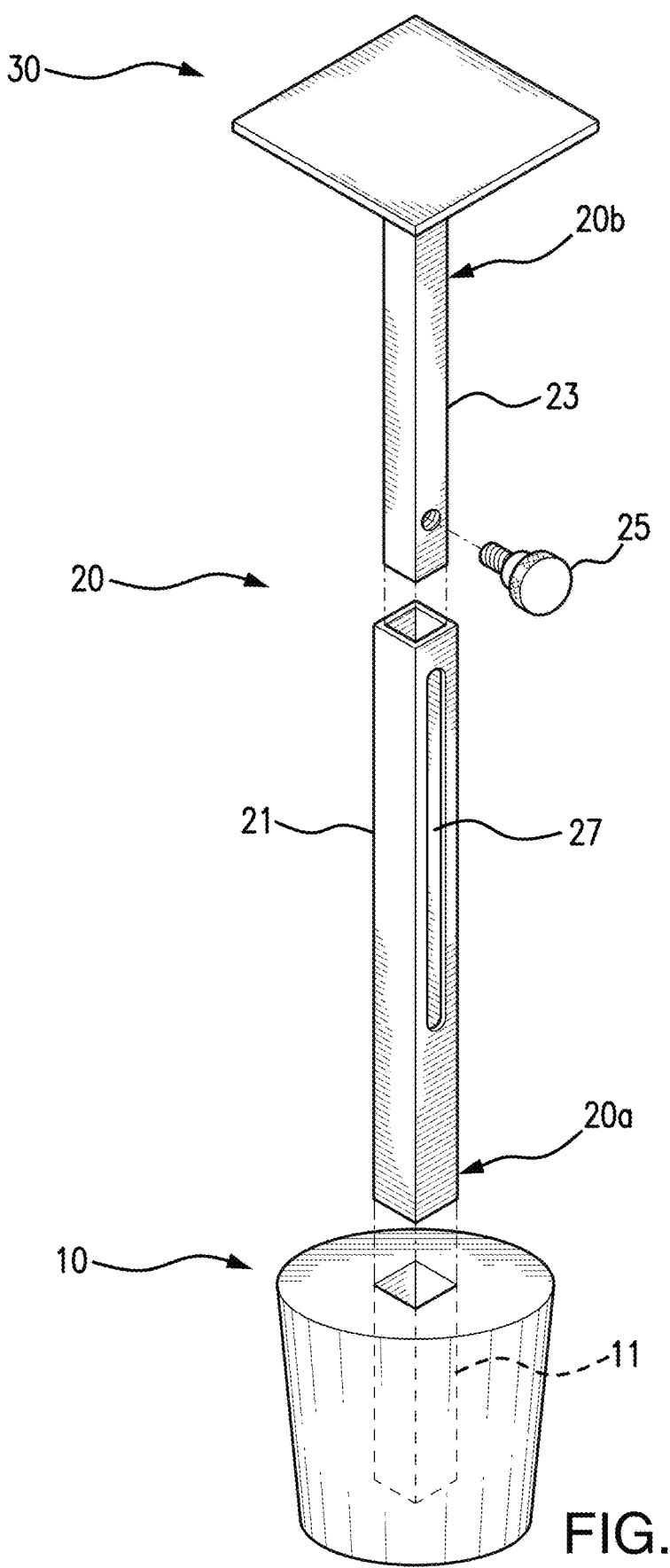
FIG. 1 is an exploded view of a reconfigurable support structure, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

All types of manned vehicles known in the art are typically equipped with some form of conveniently accessible holders for cups, beverage containers, or the like for onboard use by an operator or passenger during vehicle use. Often, the cup/beverage holder is built into a portion of the vehicle's console disposed about the available seating. The cup/beverage holder is typically formed as a shaped receptacle recessed into the console surface to receive a bottom portion of a standard cup or conventional beverage container in substantially conformed manner. The idea is to leave very little if any clearance about the received bottom portion, so as to prevent the cup or container from moving and rattling while held there during vehicle operation. Where necessary, annularly shaped inserts (formed with a generally circular or otherwise ring-shaped sectional contour) are provided which may be inserted into the holding receptacle to reduce its effective diametric extent. When used, such insert fills any residual space that would otherwise result about a smaller cup or container. The subject system makes use of these and other cup holding/receptacle features of vehicles in order to provide a highly secure and stable, yet readily accessible, support for a personal device or other such personal belonging needing to be temporarily stowed during vehicle use.

Briefly, a system realized in accordance with certain aspects of the present invention provides for an adaptively and selectively modifiable structure that is preferably anchored simply by substantially conformed insert of a base portion within the vessel's cup receptacle feature. An adjustable frame portion extends longitudinally upward from the base portion and includes a holder portion supported by the frame portion for holding a given article(s) suitably elevated from the vehicle's cup holder (or other such receptacle structure) and disposed safely away from a position where it may hinder safe operation of the vehicle, or may otherwise impair convenience or pose a safety hazard. Preferably, the holder portion is highly modular in implementation, with a plurality of selectable holding attachments variously configured (structurally and functionally) yet interchangeably coupled to the frame portion. As will be described herein, the resulting system is stable and versatile while avoiding the hazards of other storage systems.

FIG. 1 shows one of numerous illustrative examples of embodiments for such system. The illustrated embodiment includes a base portion 10, a frame portion 20, and a holder portion 30. Preferably, the frame portion 20 is detachably coupled to the base portion 10, and the holder portion 30 is detachably coupled to the frame portion 20. The holder portion 30 may be implemented with a wide range of structural configurations. It may or may not be equipped with retentive measures for holding an article resting or otherwise supported thereon, depending on the embodiment and application. As illustrated in FIG. 1, the holder portion 30 in certain simpler embodiments may provide just a resting surface for an article orientated for stable support without other retaining/restraining measures to supplement the frictional contact with a shelf-like platform presented for the article.

The base portion 10 is shaped to be conveniently dropped into a cup holding receptacle of a vehicle in closely-conformed manner. In the illustrated embodiment, the base portion 10 is shaped with a generally cylindrical outer surface which tapers downward in slightly conical fashion. That is, the illustrated base portion 10 is preferably shaped like the bottom of a standard cup, to essentially fill a cup holder conventionally formed in the console of an automobile, for example, such as is often found next to a parking brake lever handle. Preferably, the base portion 10 is of sufficient height to be at least flush with and even extend partially outward beyond the upper peripheral limit of the cup holder, or other receptacle, for secure coupling with the frame portion 20 and stable support of the holder portion 30 and article disposed thereon. As cup holders are of somewhat standardized dimensions, a base portion 10 comparably configured and sized should be compatible without further adaptive measures in a wide range of applications. However, to adapt for unconventional shapes and sizes of cup holders in other applications, and indeed for receptacles which are not designed as cup holders, a plurality of interchangeable base portions having different sizes and shapes may be interchangeably provided, so as to properly fit a variety of receptacles of different makes and models of vehicles. A separate adapter such as a suitable size-adapting insert for the given cup holder is also, or alternatively, available in certain embodiments.

The base portion 10 is formed with a sufficiently strong structure and/or material composition to resist undue deflection and structural compromise when held in the receptacle and subjected to force and pressure imparted thereto during use, such as by movements of the vehicle. The base portion 10 may be formed in that regard of any suitable material(s) known in the art such as wood, metal, plastic, rubber, composite, stone, or the like, depending on the particular requirements of the intended application. Preferably, all or a part of the base portion 10 is formed with sufficient material/ structural density to provide a sufficiently weighty mass relative to the frame and holder portions 20, 30 to serve as a suitable bottom support therefor, which resists dislodging during use. Therefore, much, though not necessarily all, of the base portion 10 is preferably formed as a solid mass.

Figure 2:
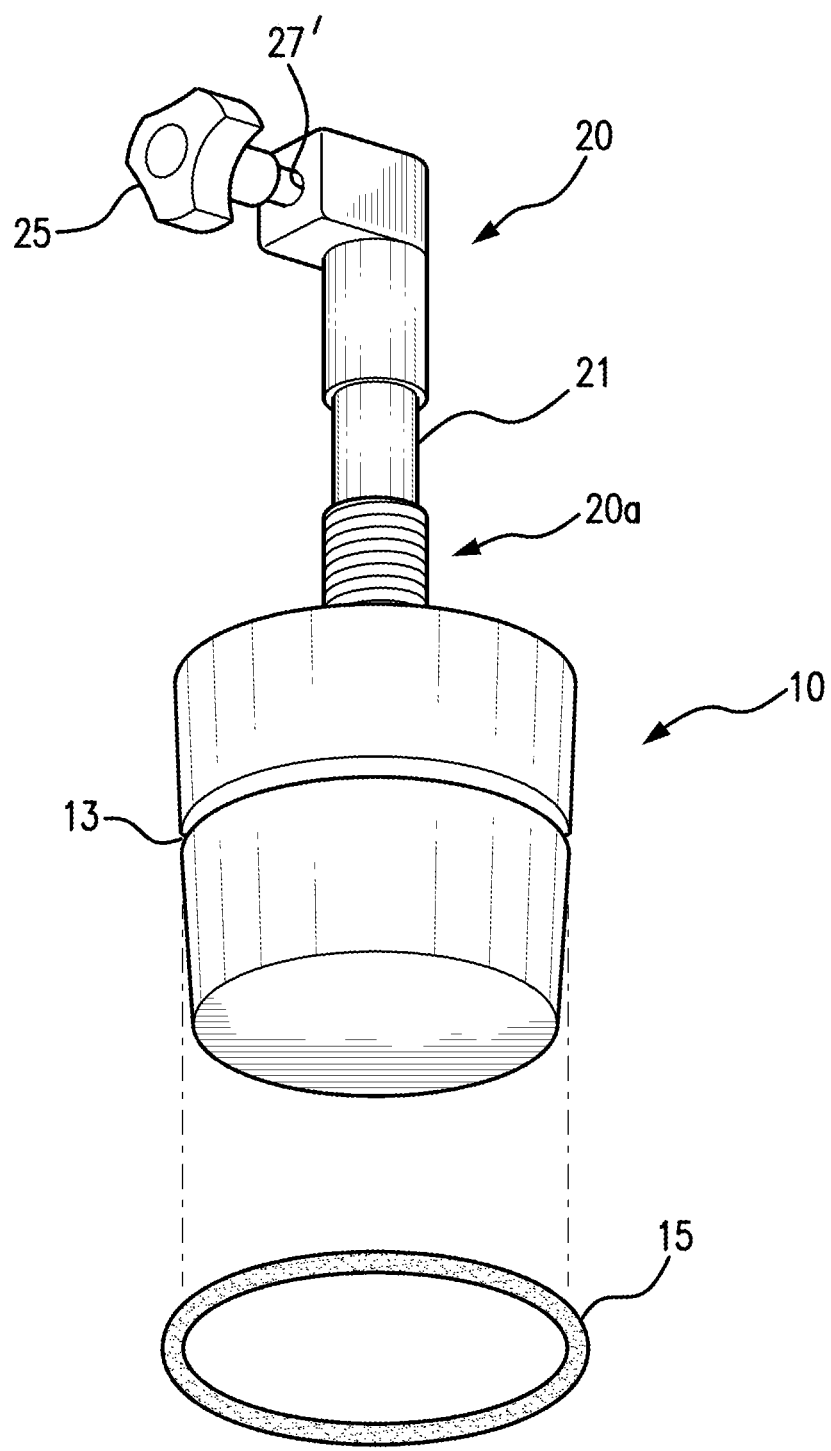
FIG. 2 is a side view of a base portion and stem member of a reconfigurable support structure, in accordance with another exemplary embodiment of the present invention.

The base portion 10 is stabilized in position primarily by its outer surface maintaining frictional engagement with the surrounding wall surfaces inside the receiving cup holder. Additional stabilizing and securing measures, although not required, are included in base portion 10 in certain embodiments and applications. For example, FIG. 2 illustrates another embodiment of the system, in which base portion 10 includes at least one annular groove 13 formed intermediately therein. A resilient ring 15, such as a rubber O-ring, is accommodated in the annular groove 13 to extend circumferentially about the base portion 10. The resilient ring 15 thus serves as a frictional and spacing adapter about the base portion 10. That is, when captured between the base portion 10 and surrounding wall surface of a receiving cup or other receptacle, the resilient ring 15 facilitates a particularly secure and stable hold within that receptacle. One or more such grooves and rings may be provided depending on the needs of the particularly intended application.

In certain other alternate embodiments, the resilient ring 15 may be integrally formed as an annularly protruding part of the base portion itself (such as when the base portion is formed of a resilient material). Additionally, the resilient ring 15 need not formed with a ring configuration as illustrated, but may in various embodiments take on other shapes and configurations along a portion of the base portion's outer surface. Likewise, the resilient ring 15 need not be extended continuously about the entire circumference of the base portion 10, so long as it provides a substantially even engagement of the surrounding receptacle wall surface to produce substantially balanced hold and retention of the base portion in the given receptacle. For example, in certain embodiments, the resilient "ring" is formed by a set of discrete protrusions that are distributed suitably about the base portion to provide the desired hold and retention with ample stability and security.

In other embodiments, a suitable friction-enhancing membrane or insert may be provided between the base portion 10 and the receptacle walls. For example, a sticky sheet of rubber material may be employed in this regard to reinforce the frictional coupling. When used, this membrane is integrated with the base portion 10 in certain embodiments, while in alternate embodiments it detachably surrounds the base portion 10, or inserts between the base portion and receptacle wall as an independent structure.

Returning to FIG. 1, in the illustrated embodiment, the frame portion 20 is preferably coupled to the base portion 10 by fitted insert into an internal bore 11 which is centrally formed in the base portion 10. The internal bore 11 is shaped to closely accommodate an insertion end 20a of the frame portion 20.

Figure 3:
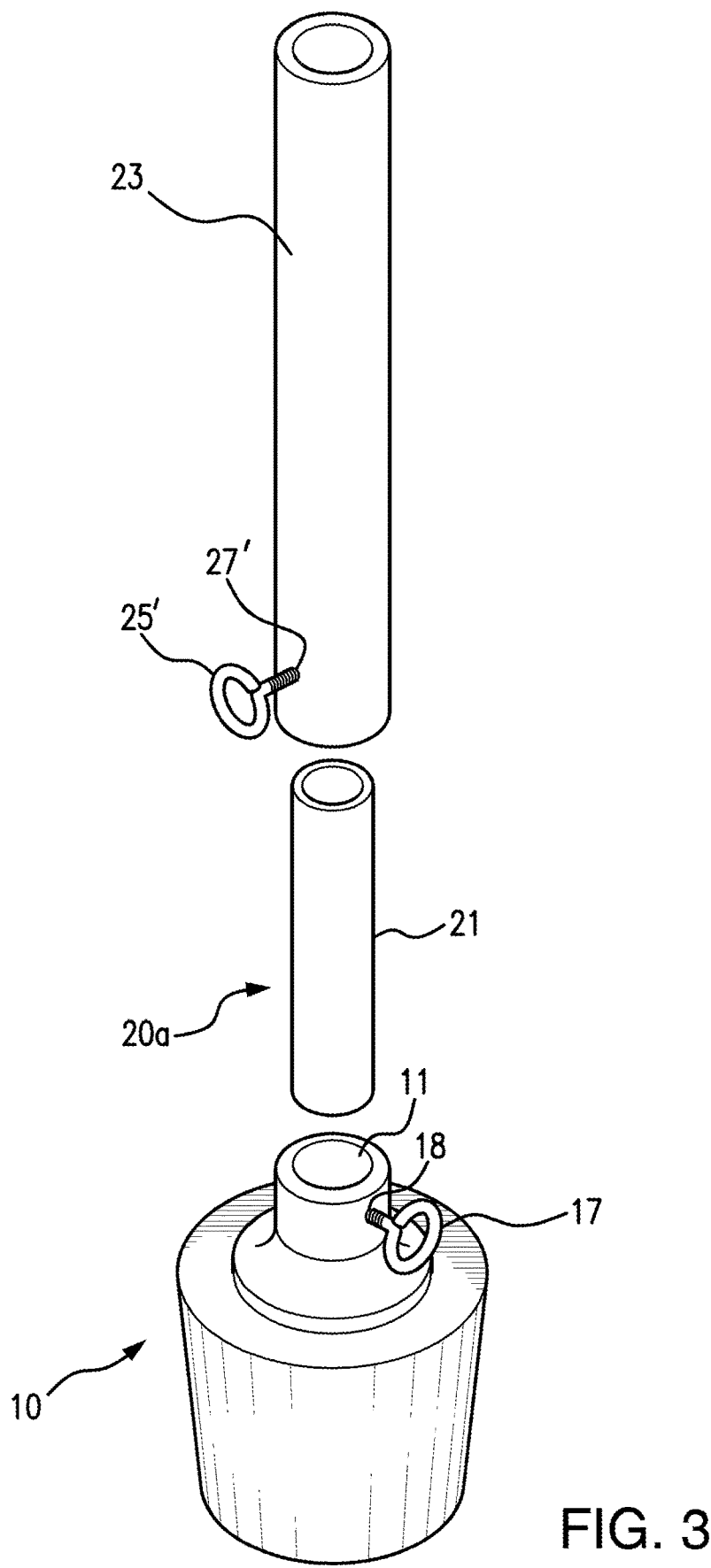
FIG. 3 is an exploded view of a base portion and frame portion of a reconfigurable support structure, in accordance with yet another exemplary embodiment of the present invention.

In the embodiment illustrated in FIG. 1, the insertion end 20a and the internal bore 11 are formed with mated rectangular sectional contours. The square or otherwise rectangular sectional contour offers the inherent advantage of resisting relative rotation the frame portion 20 by preventing unwanted rotation within the internal bore 11, even without other affixing, fastening, or locking measures. However, alternate embodiments with circular sectional contours are illustrated in, for example, FIGS. 2 and 3, where the illustrated insertion end 20a is formed with a generally cylindrical or pipe structure. Although circular sectional contours tend to allow relative rotational movement in the absence of other mutual affixing measures, they provide the advantage of rotational adjustment without forced rotation of the base portion within the given receptacle and enable simpler assembly (since the frame portion may be inserted in the internal bore 11 without having to align the corners of the insertion end 20a with the corners of the internal bore 11). Other suitable sectional contours/shapes may be employed in this regard, depending on the needs of the particularly intended application.

Additionally, while the figures illustrate the entire frame portion 20 as having a generally consistent sectional contour, a frame portion 20 with differing contours at different sections/regions along its length may be employed in certain other embodiments and applications. As one example, in certain embodiments, the insertion end 20a of the frame portion 20 may be formed with a generally circular sectional contour, to fit an internal bore 11 of similarly circular sectional contour, but other portions of frame portion 20 beyond its insertion end 20a may be formed with a square or other sectional contour. Such an embodiment may be desirable for reasons of broadened modularity, for instance, making the frame portion 20 serve much as an adapter between a base portion 10 and holder portion 30 that might not otherwise be of mutually compatible configuration.

In the embodiment illustrated in FIG. 1, secure coupling of frame portion 20 with base portion 10 is provided by a combination of gravity, leverage, and frictional contact between mated/interfacing surfaces, once the insertion end 20a is coaxially inserted to a sufficient depth within the internal bore 11. Accordingly, the internal bore 11 is preferably configured to extend most or all of the axial height of the base portion 10, and the insertion end 20a is of sufficient length to coaxially fill the internal bore. However, other suitable means of engagement known in the art may be employed for secure and stable intercoupling. For example, in the embodiment illustrated in FIG. 2, the insertion end 20a is threadedly engaged within the internal bore 11. As another example, in the embodiment illustrated in FIG. 3, at least one coupling/set screw 17 is inserted through at least one coupling hole 18 in base portion 10, which is in communication with the internal bore 11. The coupling screw 17 transversely engages the insertion end 20a and bears thereagainst to brace it against the opposite wall of the internal bore 11. Alternatively, other suitable coupling measures known in the art, both adjustable and otherwise, may be employed. These include but are not limited to collar-like fittings that may be adjustably constricted or expanded, snugly-fitting joints, transverse locking bolt-like or pin-like fasteners which may be tightened or loosened to releasably fasten two coaxially or collinearly joined members, releasable latching or clamping mechanisms for telescopically intercoupled members, removable locking pin members passed through openings in telescopically intercoupled members, and protruding notches in one member fitted to channels or indentations in the other.

In the illustrated embodiment of FIG. 1, the frame portion 20 includes at least first and second sections which are telescopically intercoupled for adjustable axial displacement relative to one another in releasably locked manner. One of these sections are formed in the illustrated embodiment by a stem member 21—for example, a support rod or pipe—which includes the insertion end 20a and extends longitudinally upward from the base portion 10. Another of the first and second sections of the frame portion 20 is formed by an extension member 23 coaxially fitted and coupled in slidably displaceable manner to the stem member 21 for adjustable longitudinal extension therefrom. The extension member 23 is illustrated as fitted within the stem member 21, although in other embodiments, such as in FIG. 3, the stem member 21 may be alternately fitted within the extension member 23.

In the illustrated embodiment of FIG. 1, the extension member 23 is coupled in a telescopically adjustable manner to the stem member 21. As a result, the extension member 23 may be selectively secured to the stem member 21 at any of a range of heights relative to the base portion 10. More specifically, the illustrated embodiment preferably employs a threaded bolt 25, which fits through a slot 27 in stem member 21 to releasably capture the stem member 21 and extension member 23 together against each other at a selectively adjusted height (or selectively adjusted length of the stem member and extension member combined). However, other suitable means known in the art may be employed to displaceably couple extension member 23 to stem member 21 in selectively adjustable manner. For example, in the example embodiment illustrated in FIG. 2, a threaded bolt 25 is inserted through an engagement hole 27' in stem member 21 to brace an inserted extension member 23 (not illustrated in this figure) against an opposing internal wall of stem member 21. In another example embodiment illustrated in FIG. 3, an engagement hole 27' is formed in a side of extension member 23, and a threaded pin 25' is inserted (much like a set screw) therethrough to brace an inserted stem member 21 against an opposing internal wall of extension member 23. Additionally, any of the other coupling measures described above for coupling the base portion 10 to the frame portion 20 are also potentially suitable for the coupling of the stem member 21 and extension member 23, depending on the particular configuration of the stem member 21 and of the extension member 23. For example, an extension member 23 in certain embodiments and applications may be threadedly engaged or frictionally fitted to the stem member 21 or another extension member 23 for releasable coupling thereto.

In certain other embodiments not shown, the extension member 23 may be of sufficiently great axial/longitudinal length that it is simply placed with one end resting upon the upper surface of the base portion 10, with the stem member 21 fitted inside. Alternatively, the extension member 23 may be of sufficiently short length that a stopper formed at or near a top of extension member 23 rests on the top of stem member 21. Such embodiments leverage the use of gravity and the weight of higher sections of the structure to maintain engagement.

Figure 4A:
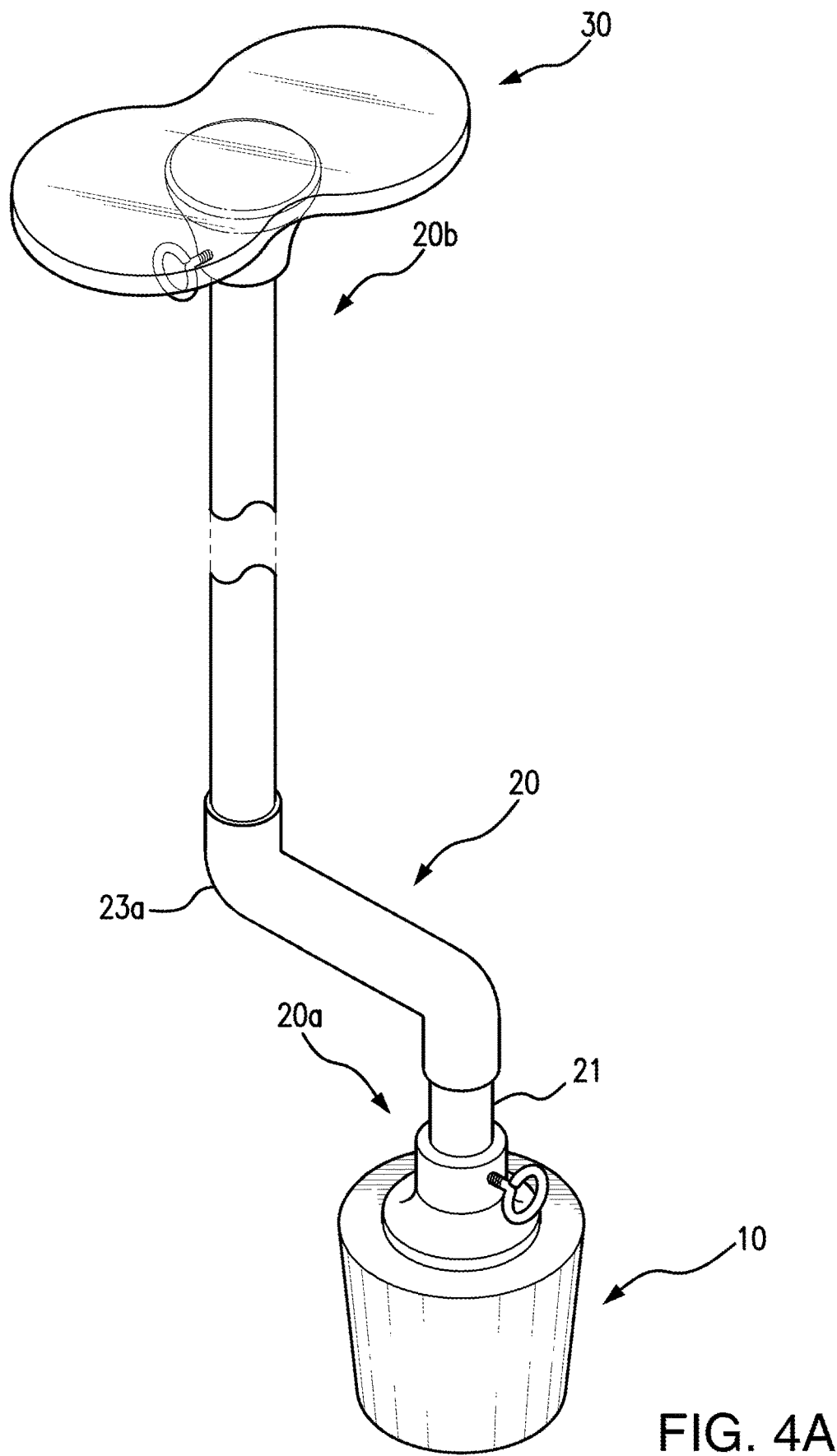
FIGS. 4A and 4B are side views of two configurations of a reconfigurable support structure, in accordance with another exemplary embodiment of the present invention.
Figure 4B:
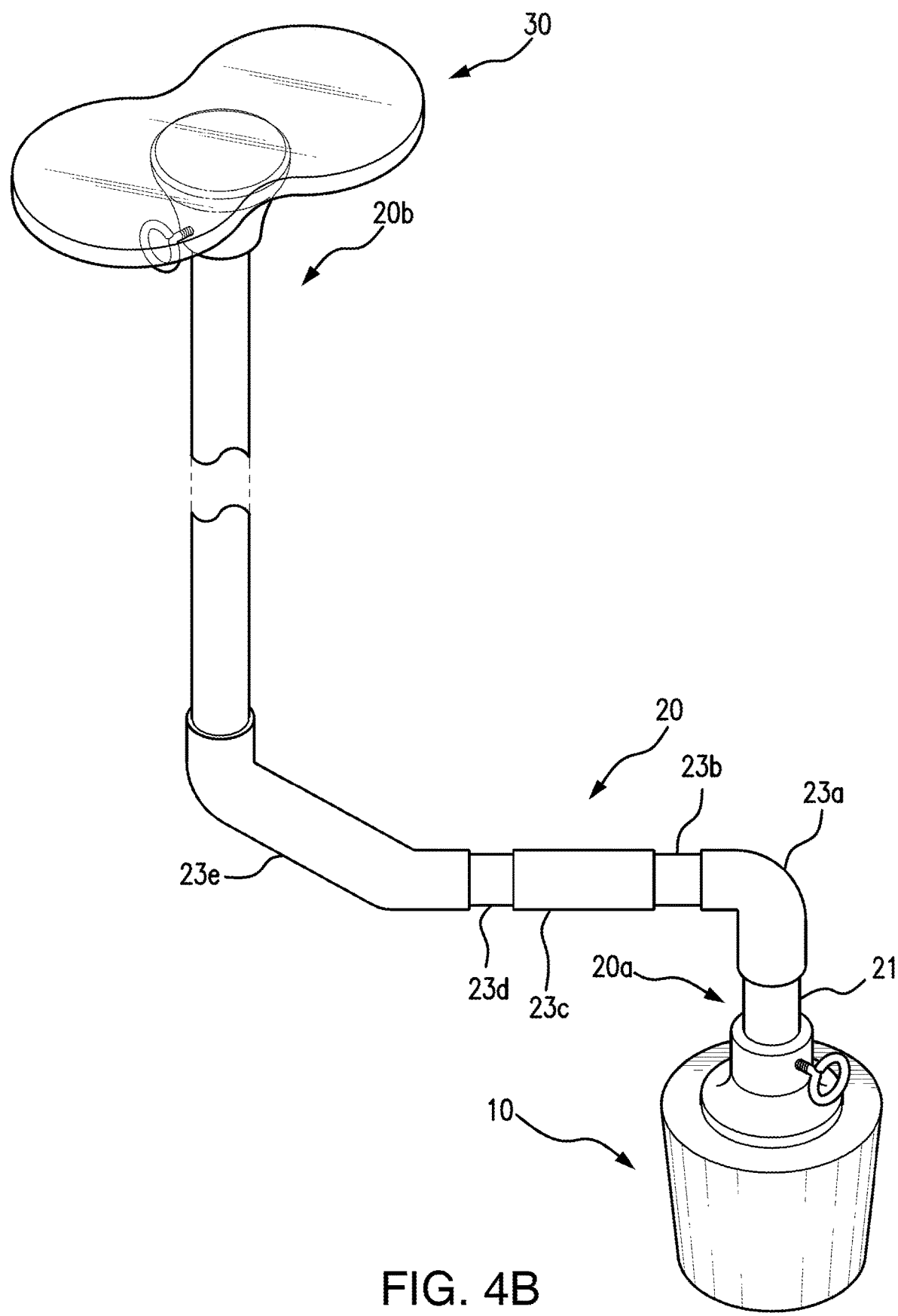

Preferably, individual elements of the frame portion 20 are modular and reconfigurable. As such, multiple extension members 23 may be substituted for one another or combined together in order to alter the positioning, relative to the base portion 10, of an attachment end 20b of the frame portion 20 opposite to the insertion end 20a. Each extension member 23 may extend both vertically and transversely, and be of any suitable length or configuration. FIG. 4A illustrates an example configuration, in which extension member 23a is configured as an elbow joint member, and extension member 23b is configured as a straight member. The illustrated configuration therefore places the attachment end 20b of the frame portion 20, and the holder portion 30 which is coupled thereto, at a position that is both elevated in height and offset horizontally from the base portion 10, and therefore the given receptacle. A more complex example configuration is illustrated in FIG. 4B, in which several extension members 23a-23e, including both angle joints 23a and 23e of differing angles, straight adapter 23c, and straight extensions 23b and 23d of differing lengths, are combined modularly to place the holder portion 30 at a desired position without unduly compromising stability of support.

In certain embodiments, particular extension members effectively take the form of adapters, and are configured to fit between two other extension members, or another extension member and a stem member, which are not compatible in configuration to be fitted to each other directly. Straight adapter 23c in the embodiment illustrated in FIG. 4B illustrates one example of such an adapter extension member, which accommodates the connection of straight extensions 23b and 23d, which are of the same diameter and therefore cannot fit inside each other.

Although not illustrated, jointed extension members may be suitably configured as universal joints or other adjustable, multi-dimensional pivot joints, preferably with locking screws so as to secure the angle of the joint. Such joints may be of the type found, for example, on microphone stands which allow for tilting adjustment along multiple planes, which is particularly useful for easy one-handed adjustment of the position and angle of a holder portion. Furthermore, although not shown, branching extension members of any suitable configuration known in the art may be employed in certain embodiments and applications, which provide, for a single frame portion 20, a plurality of attachment ends 20b to respectively accommodate a plurality of holder portions 30.

In certain embodiments, multiple telescoped extension members may be provided for an enhanced range of adjustable extension up and down. Furthermore, in combination with extension members that angle the support portion laterally, telescoped extension members may be attached to adjustably extend the frame portion in other directions, for example to adjust a lateral extension member toward or away from the driver or a passenger. In combination with pivot joints, telescoped or otherwise slidably adjusted members provide a user with multiple degrees of freedom in adjusting the holder portion 30 and therefore the support of a given personal article.

In summary, it will be clear to those of skill in the art that with a sufficient set of modular extension members suitably implemented in the form of arms, couplings, slidable interconnections, telescopic extensions, and the like, a wide range of adaptable configurations for the frame portion 20 may be employed in a single system to suit a user's unique, highly customized needs.

A strong and rigid yet lightweight material is preferred for the components of the frame portion 20. Suitable materials for this purpose are well known in the art and will not be further described in detail herein. For example, they include but are not limited to plastics such as polyvinyl chloride (PVC) and metals such as aluminum and steel. To further enhance the lightweight nature of the frame portion 20, and also to provide the telescopic coupling described above, one or more components of the frame portion 20 are preferably formed with a hollow configuration. However, in certain embodiments and applications, it may be desirable for at least some components to be of solid configuration for greater rigidity. Also, it may not be possible or practicable for some extension member components, such as pivot joints, to be formed with a hollowed interior.

In the embodiment illustrated in FIG. 1, the holder portion 30 is detachably coupled to the attachment end 20b of the frame portion 20. Releasable coupling measures are preferably employed to intercouple the holder portion 30 to the attachment end 20b and extension member 23. In alternate embodiments and applications, the holder portion 30 may be coupled by an integrally formed joint with attachment end 20b, to thereby terminate the upper tip of the extension member 23.

For example, in certain embodiments such as illustrated herein, attachment end 20b is inserted into a coupling structure—forming an internal bore, a hollow tube extension, or the like—provided by the holder portion 30. The attachment end 20b is matched in configuration for engagement with the internal bore 11 of the base portion 10. As with the insertion end 20a of the frame portion 20 and the internal bore 11 of the base portion 10, if the attachment end 20b engages a sufficiently deep bore or hollow (in coupling to the holder portion 30), the insertion itself in combination with the weight of the holder portion 30 (and article supported thereon) should be sufficient to prevent unwanted disengagement in typical applications.

Figure 5A:
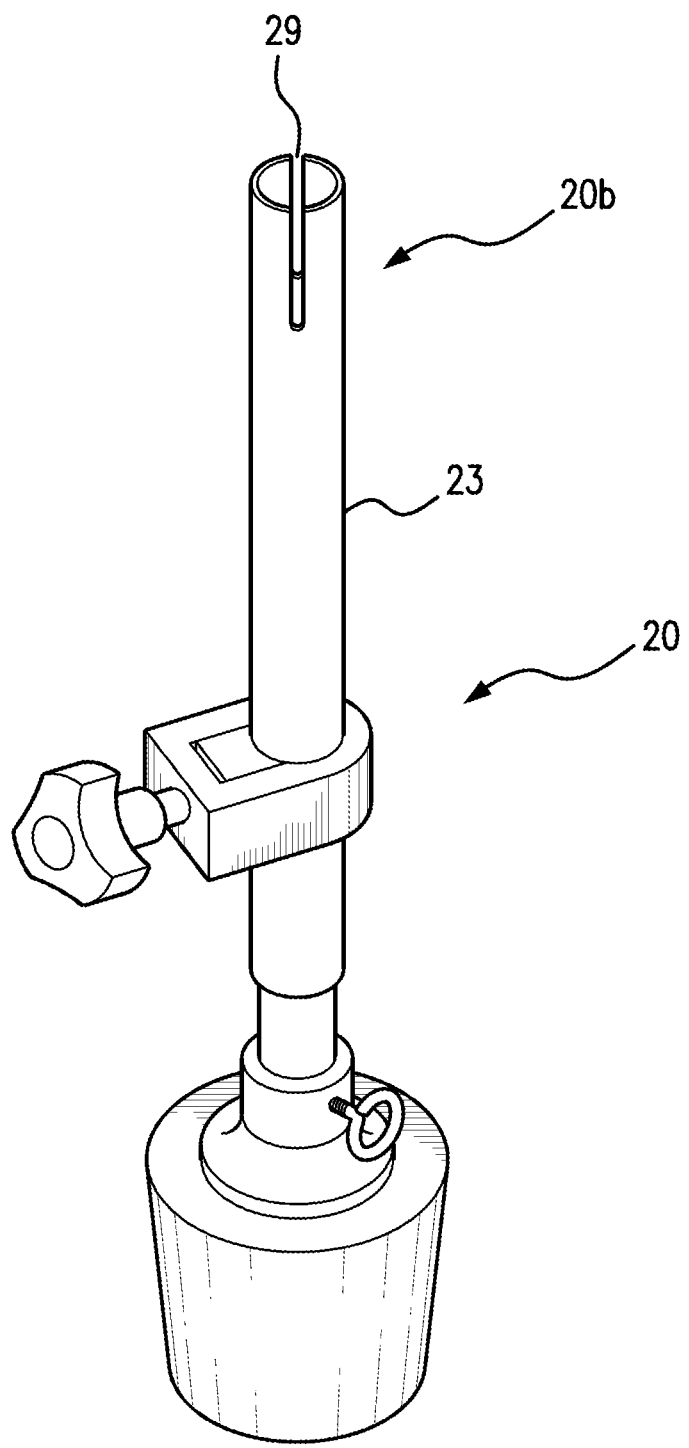
FIGS. 5A and 5B are views of an attachment end and a corresponding engagement bore of a reconfigurable support structure, in accordance with yet another exemplary embodiment of the present invention.
Figure 5B:
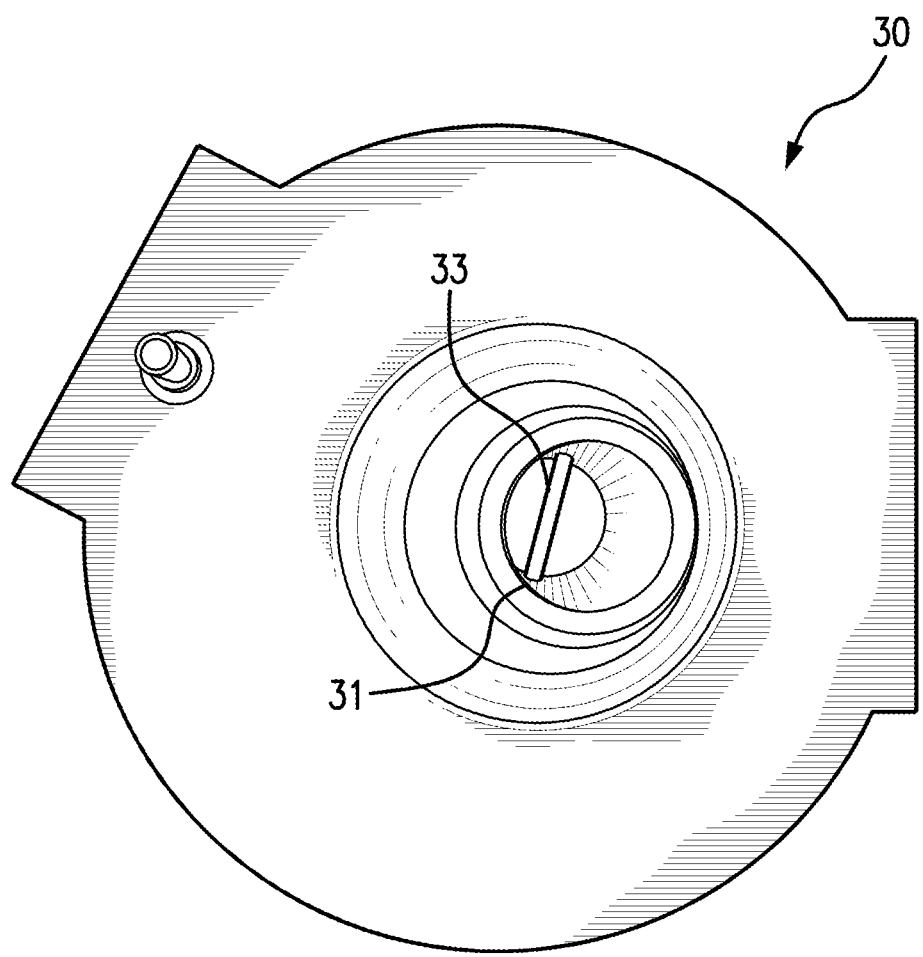

Nonetheless, in certain embodiments, such as illustrated in FIGS. 5A and 5B, the attachment end 20b of the frame portion 20 includes a diametrically extended retention slot 29 which runs axially down along the attachment end 20b from an upper terminal end.

As the extension member 23 illustrated in FIG. 5A has a hollow configuration, the illustrated retention slot 29 is actually formed by two retention slots running longitudinally down along diametrically opposed parts of the extension member's cylindrical wall. However, these slots in combination provide substantially the same function as a single retention slot 29 formed in a solid extension member 23, and therefore will be discussed herein as if they were one unified feature, unless otherwise specified.

A cross member 33 is formed within an engagement bore 31 of the holder portion 30 to extend transversely thereacross. The cross member 33 slidably engages the retention slot(s) 29 when the attachment end 20b is axially received by the engagement bore 31. The engagement of the retention slot(s) 29 with the cross member 33 provides additional stability, and in particular prevents rotation and other angular displacement when attachment end 20b and engagement bore 31 are formed with circular sectional contours. As the position of the cross member 33 may not be easily visible, corresponding guide markers are preferably formed on an outer, visible surface of the frame portion 20 and of the holder portion 30, such that aligning these guide marks also ensures alignment of the cross member 33 with the retention slot(s) 29.

Additionally, any of the other coupling measures described above for coupling the base portion 10 to the frame portion 20, or the stem member 10 and the various extension members 20 to each other, are also potentially suitable for the coupling of the holder portion 30 and frame portion 20, depending on the particular configurations of the frame portion 20 and holder portion 30. Regardless, the coupling is preferably locked, or lockable, against angular displacement of the holder portion 30 relative to the frame portion 20, thereby providing a stable platform which will not unexpectedly change angle during use.

The holder portion 30 preferably includes any suitable measures known in the art for providing a stable support platform or other structure or assembly on which to place a given article. Depending on the needs of the particular embodiment and application, the holder portion 30 includes suitable measures for retaining or otherwise securing the article to remain on the platform during use. The holder portion 30 may be made of any suitable materials for such assemblies, including but not limited to metal, plastic, transparent glass or Plexiglas, and wood.

Figure 6A:
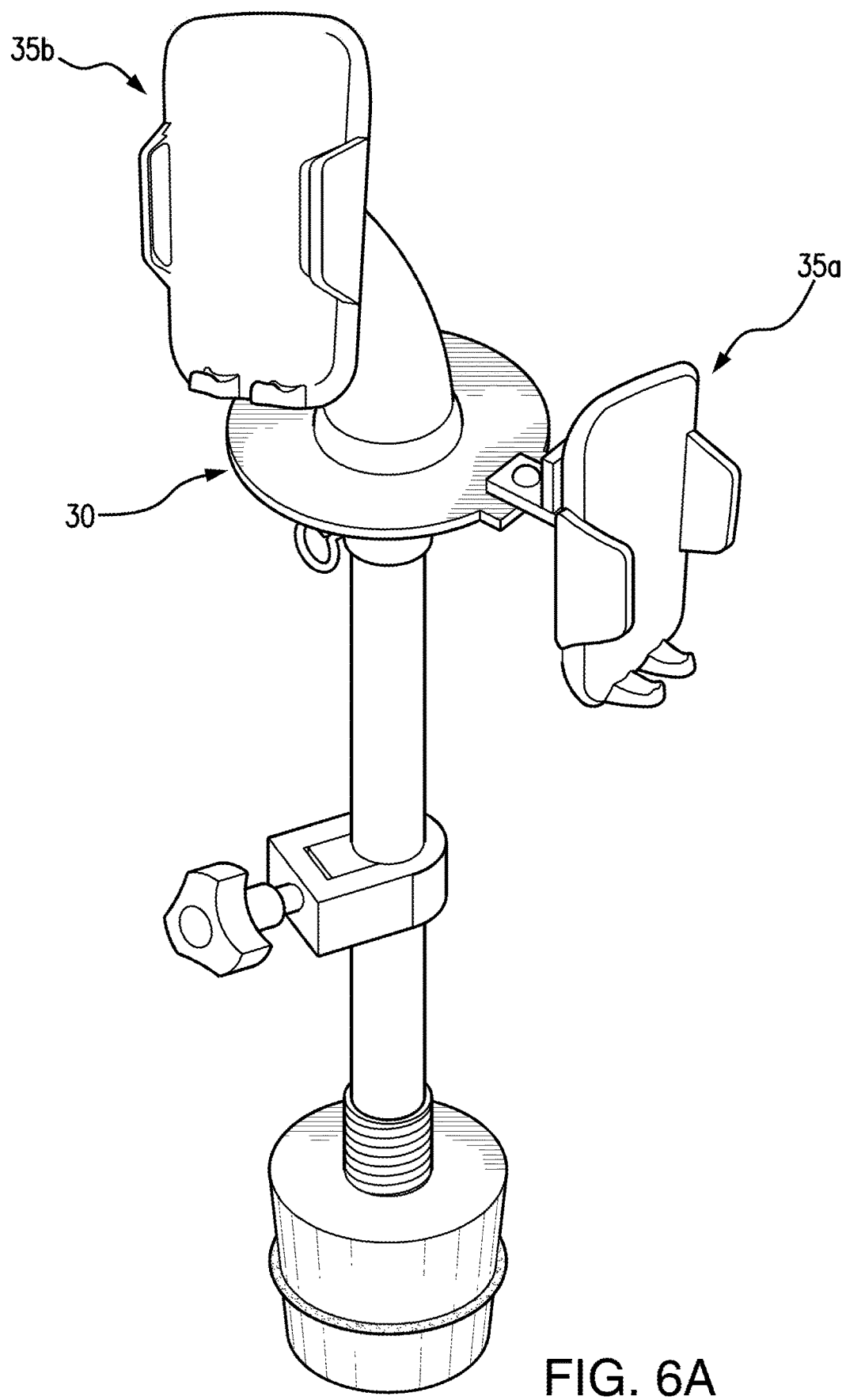
FIGS. 6A and 6B are perspective views of two holder portion of a reconfigurable support structure, in accordance with an exemplary embodiment of the present invention.
Figure 6B:
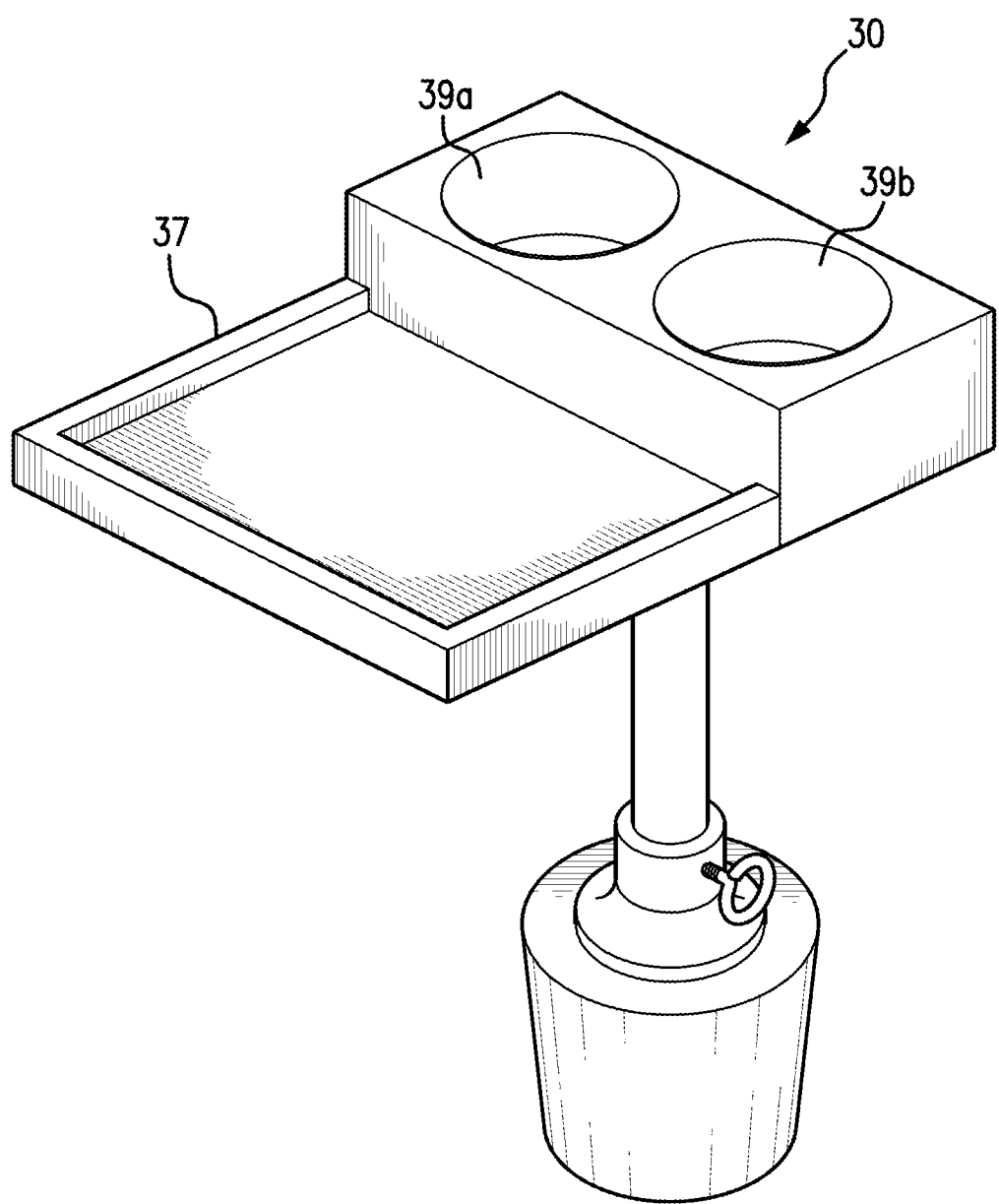

The particular selected configuration of the holder portion 30 may vary widely to suit the particular configuration of the given article or other particular requirements of the intended applications. As a simple example illustrated in the embodiment of FIG. 1, the holder portion 30 is formed with a planar table platform configuration. Other examples of holder portion configurations are illustrated in FIGS. 6A and 6B. The holder portion 30 illustrated in FIG. 6A includes a pair of adjustable, mobile device mounts 35a, 35b, of a type well-known in the art, respectively attached to a top and a side of the holder portion 30. The holder portion 30 illustrated in FIG. 6B combines a bounded tray 37 with a pair of cup holders 39a, 39b. Still other holder portions may include but are not limited to tray structures for loose items such as change or jewelry; clipping and mounting measures; compartment-defining assemblies with or without lids or locking mechanisms; bodies having retaining rings or recesses formed thereon; and various other implements or assemblies whereby a user may place a particular article(s) while riding in the vehicle without undue fear of inadvertent drop or release therefrom; as well as combinations of one or more of the above.

In certain embodiments, multiple assemblies may be modularly coupled together on a central coupling platform, such as a Y-shaped coupling piece with support arms, or a platform with one or more mounts or screw holes for the attachment of various modular assemblies. It is noted, for example, that the first device mount 35a in the embodiment illustrated in FIG. 6A is removably affixed to the central platform of the holder portion 30 by screws, and the second device mount 35b is removably affixed to the central platform by a suction mechanism.

With a sufficiently strong and rigid base portion 10 and frame portion 20, the configuration of modular holder portions 30 are limited only by the available space in the vehicle, and may replace numerous mounting fixtures of more complex and costly structure.

One particular application is found in law enforcement vehicles such as police cruiser, which are frequently of standard vehicle design but are also typically equipped with sizable computer devices. Instead of requiring elaborate custom-formed (and expensive) mounting fixtures, support for these devices may be provided in accordance with an exemplary embodiment of the subject system inserted into a simple console cup holder receptacle. The holder portion 30 may include a support tray formed of a strong plastic, metal, or wood construction equipped with suitable measures for detachably and releasably securing a laptop. These securing measures may include hooks, loop strips, gripping rubber pads, or the like.

Preferably, the holder portion 30 is of modular configuration, and may be replaced by another holder portion of different form to adaptively suit the needs of a particular vehicle occupant. Using the various holder attachments shown, the user may provide convenient support and storage for such things as sunglasses, pencils, jewelry, license and registration, or the like.

It is noted that the holder portion 30 may be integrally formed with the extension member 23, yet the extension member 23 may be separable from the stem member 21. In such embodiment, the holder portion 30 is still detachably coupled to at least part of the frame portion 20 and thereby modular, as is preferable for the reasons given above.

In operation, the base portion is inserted into a cup holder receptacle, and the frame and holder portions are modularly configured to respectively meet the positioning and article containment needs of a driver or passenger. When the frame and holder portions are coupled for use with the base portion, their extension upward out of the base portion tends to yield a top-heavy, tree-like structure, especially when loaded with the personal device or other article to be supported. The cantilevered effect due to the longitudinally extended frame portion, and in some embodiments a transverse extension of the holder portion fitted thereto, urge a tilting force upon the base portion. Since the base portion is essentially dropped into and substantially fills the holder receptacle in closely conformed manner, a tilting force imparted to the base portion causes diagonally opposed regions of that base portion to bear against adjoining regions of the surrounding receptacle surface with that force. This resulting tension between the base portion and the surrounding surfaces of the receptacle makes for tighter retention of the base portion therein, and guards against inadvertent escape of the base portion from the receptacle even as the vehicle moves, turns, jolts, and vibrates during operation. The added weight of the user's personal article supported on the holder portion only adds to the retentive tension between the base portion and receptacle. Hence, there is a built-in bias towards retention of the base portion within the vehicle receptacle, which is only reinforced by loading the system with the personal article to be supported.

In other words, the swaying effect of a tall tree-like extension of the frame portion and its potentially top heavy attachments actually contributes positively to securing and stabilizing the overall structure. While the heightened holder portion raises the system's center of gravity, this actually helps to retain the base portion inside the receptacle by causing a lateral tension or a tilting tension to be applied inside the cup holder receptacle. This makes the base portion's hold therein only tighter. Even as the system's frame and holder portions branch out to approach the height of the passenger compartment of larger vehicles, the system remains highly stable as a result.

This is counter-intuitive, as a long-necked structure topped with weight tends to increase sway and to urge the base to pop out of the receptacle more readily when, for instance, the vehicle hits a bump on the road. The resulting jolt would seemingly disturb the inserted coupling and loosen the base portion from the receptacle. But in actuality, even when encountering most bumps on the road, if there is sufficient weight on or within the base portion, it does not pop out of the receptacle, and therefore the tilting force that is applied by the supported weight serves to reinforce the base portion's coupling inside that receptacle.

Especially when configured to manageably hold a mobile phone device, the subject system aids in preserving overall vehicle safety. Many drivers still tend to operate their vehicles to some extent while interacting with their mobile phone devices. But the subject system serves much as an extra pair of hands to safely hold the device, and enable its safe adjustment wherever and however the user wants. Moreover, the system does not obstruct the view through the windshield. Instead of affixing a support structure anywhere on the windshield or window, one places the subject system in a convenient cup holder.

Additionally, the system is highly adjustable and adaptable. In preferred embodiments, the structure is telescopically or otherwise vertically adjustable, such that one may readily adjust the height as desired. Depending on the vehicle, the receptacle being employed may be at a variety of heights relative to the driver. For example, a cup holder for a van or bus may be disposed considerably lower, relatively, than a cup holder for a sedan. Therefore the system is preferably adjustable to support the given personal article at a height that may be easily reached and interacted with by the driver or passenger without any obstruction to field of view. This adjustment may be achieved using one or more of the measures described above. Again, in the context of electronic devices, the holder portion may be positioned more specifically to provide stable support of the device at a preferred position where, for example, a microphone is positioned near a user's mouth, a screen displaying a GPS map is positioned at a point where the user may easily view it, or a video camera is positioned to maintain a clear and unobstructed view for filming such subjects as the user or the road.

In certain configurations where the holder portion is being used to contain an electronic device, like a mobile phone, music player, or laptop, it may be desirable to connect the device to a charging port, USB port, media port, or other outlet by means of a cable or wire. Running this cable directly from the holder portion to the port may impede movement or result in tangling, and is likely to be unsightly and unmanageable. Therefore, in the interests of both safety and neatness, it would be preferable in those situations to route the cable through the frame portion of the system.

In the exemplary embodiment illustrated in FIGS. 7A-D, a cable groove 19 is provided in the base portion 10 to route such a cable. Specifically, a side groove 19a extends down the side of the base portion 10, and a bottom groove 19b extends across the bottom of the base portion 10 from the side groove 19a to the internal bore 11. In this embodiment, the internal bore 11 defines an upper, or bore, opening 11a which extends to an access opening 11b at the bottom of the base portion 10. Preferably, this access opening 11b is smaller in diameter than the bore opening 11a defining that part of the internal bore 11 which actually receives the stem member 21 of the frame portion 20. The transition between the lesser diameter of the access opening 11b and the greater diameter of the bore opening 11a defines a stopping surface that stops and prevents the stem member 21 from slipping through the bottom access opening 11b. The access opening 11b need not be of similar shape as the bore opening 11a. For example, the top bore opening 11a may be square in sectional contour (as illustrated for an alternate embodiment indicated by the broken lines surrounding top opening 11a in FIG. 7A), while the bottom access opening 11b may form a round hole (as illustrated), narrow slot, or other contour.

Figure 7D:
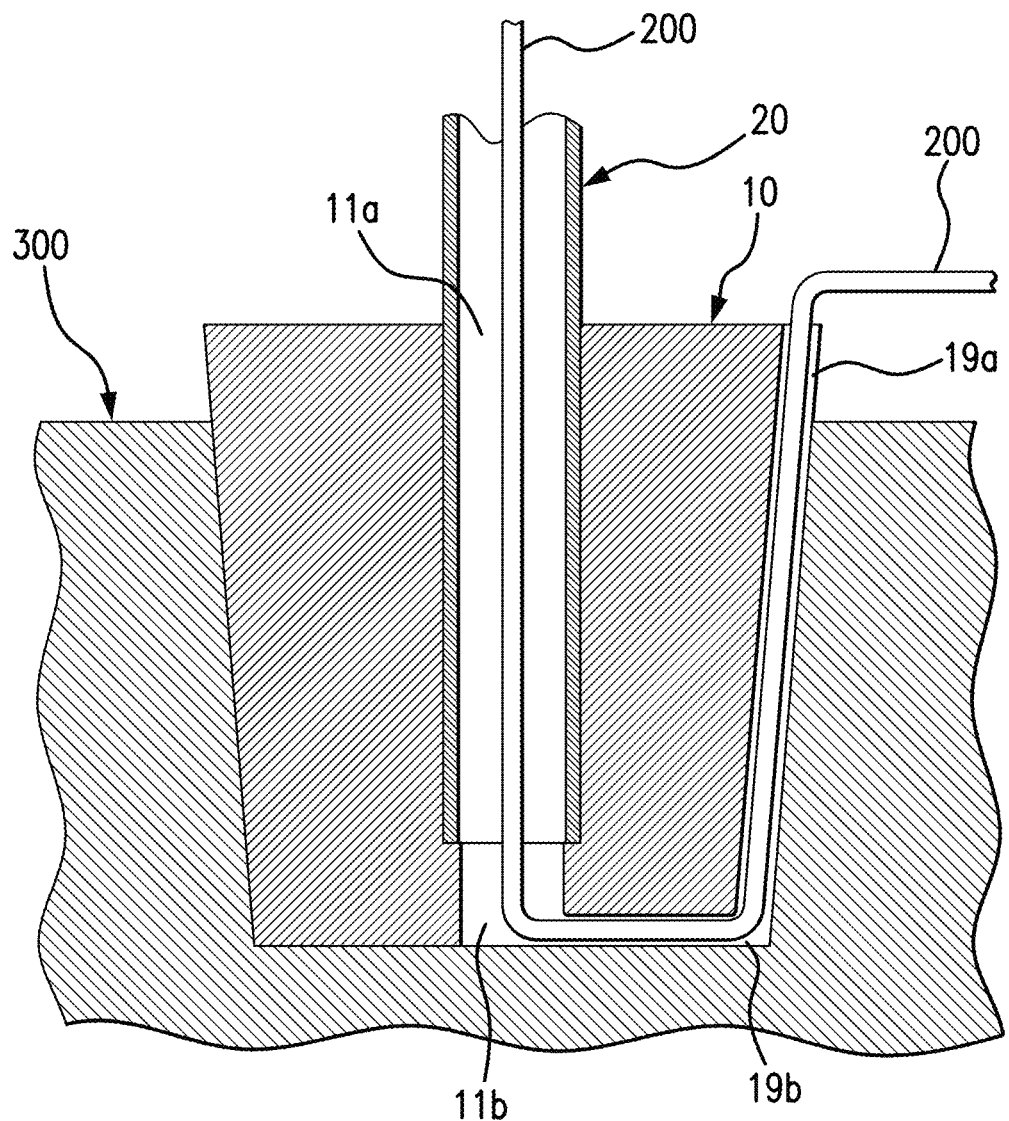
FIG. 7D is a cross-sectional view of the reconfigurable support structure of FIG. 7A in use, in accordance with an exemplary embodiment of the present invention.

As illustrated in FIG. 7D, the cable groove 19 accommodates a cable or wire 200, which may thereby extend the length of the cable groove 19 without unduly interfering with the engagement of the base portion 10 when fitted in the cup holder or other receptacle 300. The cable 200 is routed through the access opening 11b of the internal bore 11, then up through the top opening 11a. If at least part of the frame portion 20 is hollow, the cable 200 is further routed therethrough, to emerge through a suitable opening in the holder portion 30 or in an upper section of the frame portion 20.

Alternatively, the cable groove 19 may also be formed to extend along the internal bore 11 itself. FIG. 7A additionally illustrates an alternate cable groove 19' (indicated by broken lines) formed down an inner side of the internal bore 11. When a frame portion 20 is then inserted into the internal bore 11, the cable groove 19' remains outside the frame portion 20, and the cable or wire may run down to the bottom of the internal bore 11 on the outside of the frame portion 20, and then up through the interior of the frame portion 20. This alternative cable groove 19' may also be set apart from the internal bore 11, as a smaller bore of sufficient width to fit the cable and any end couplings thereof. Such groove would communicate with the internal bore 11 by a channel formed, for instance, to extend across a bottom surface of the base portion 10 transversely therebetween. In such embodiments, the bottom access opening 11b may be omitted so long as suitable measures are employed to prevent undesirable interference (and pinching) of a transversely crossing portion of the cable by a bottom terminal end of the frame portion 20.

In certain embodiments, the cable 200 may be provided with the system, and one end may be attached, detachably or permanently, to the holder portion 30 to provide for an integrated charging port or interconnection dock for a device.

In certain embodiments, the cable groove 19 may be omitted and the cable 200 simply routed underneath the base portion 10 and through the bottom access opening 11b without the guidance of a groove. However, this may compromise the fit of the base portion 10 to the receptacle 300, and may also damage the cable 200 as the expected rocking of the base portion 10 will pinch and apply weighted pressure to the cable 200 against the walls and/or bottom of the receptacle 300.

In this manner, one end of a cable or wire may be plugged into a vehicle port while the other end may be plugged into a device situated on the holder portion, with the intermediate parts of the cable neatly contained and out of the way within the system as a whole.

In certain embodiments, multiple cup holder receptacles may be employed in combination to cooperatively support multiple base portions sharing a common frame portion. This may be feasible where multiple cup holder receptacles are provided in a given vehicle in close proximity to one another. One or more bridging or cross-coupling members may be employed to provide a connection between the frame portions extending from the respective base portions. Using two cup holders in tandem provides greater strength of support and more stability in certain applications. Since the base portions would not be independently movable, however, the cantilevered self-retaining feature due to the tilting action of a base portion closely fitted inside a receptacle may be diminished. That is, when a bridging structure is placed between two frame portions or holder portions emerging from different base portions, their rigid intercoupling may rob (constrain) each individual base portion of its freedom of movement, and thereby compromise the hold that each base portion would otherwise have individually inside its cup holder receptacle. Nonetheless, configurations with multiple base portions are not outside the scope of the invention.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. A reconfigurable system providing adjustable support for a personal article of a user in a manner releasably anchored to a built in cup holder receptacle onboard a vehicle, comprising:
    a base portion configured to substantially fill and maintain self-retaining fit within the cup holder receptacle during use, said base portion including an integrally formed body having a generally cylindrical outer surface tapered to extend conically downward, said base portion being thereby configured to substantially fill the cup holder receptacle with said generally cylindrical and conically tapered outer surface engaging an inner surface of the cup holder receptacle, the body of said base portion having an internal bore extending axially therein from an upper opening;
    a frame portion engaging the internal bore of said base portion to extend longitudinally upward therefrom, said frame portion having at least first and second cylindrical sections telescopically coupled to one another for both rotational and axial relative displacement in releasably locked manner, said first and second sections being mutually locked against angular displacement at different axial positions relative to one another during use, one of said first and second sections defining an attachment end; and
    a holder portion coupled to the attachment end of said frame portion, said holder portion including a table platform defining a planar support plate surface and a plurality of mounts for the personal article, at least one of said mounts being coupled adjacent a periphery of said table platform and extending transversely therefrom in cantilevered manner for reinforcing the self-retaining fit of said base portion within the cup holder receptacle;
    wherein said holder portion is selected from a plurality of modular holder structures having different structural configurations for holding personal articles of different types.

2. The reconfigurable system as recited in claim 1, wherein said base portion includes at least one stabilizing member extending at least partially about said outer surface thereof, said stabilizing member protruding from said outer surface for frictional capture against the inner surface of the cup holder receptacle during use.

3. The reconfigurable system as recited in claim 1, wherein said base portion is formed with a cable groove formed in said outer surface, said cable groove extending down along a side of said outer surface to a bottom thereof for providing clearance against the inner surface of the cup holder receptacle during use to pass a cable therebetween without interfering with said base portion engagement of the cup holder receptacle.

4. The reconfigurable system as recited in claim 1, wherein said second section of said frame portion terminates at an insertion end configured for fitted insert into the internal bore, said insertion end being securable against angular displacement relative to the internal bore when inserted therein.

5. The reconfigurable system as recited in claim 4, wherein said insertion end and the internal bore are formed with polygonally mated sectional contours.

6. The reconfigurable system as recited in claim 4, wherein said insertion end and the internal bore are formed with substantially circular mated sectional contours for adjustable angular positioning one relative to the other, said base portion including a coupling member releasably locking said second section of said frame portion in selectively set angular position relative to said base portion.

7. The reconfigurable system as recited in claim 4, wherein said first section of said frame portion is coupled to extend transversely from said second section of said frame portion and laterally offset the attachment end from the insertion end of said second section, said frame portion thereby maintaining a cantilevered bias force upon said base portion when received in the cup holder receptacle.

8. The reconfigurable system as recited in claim 1, wherein said first section of said frame portion terminates at the attachment end, and said holder portion is coupled to the attachment end of said first section in releasably locked manner against angular displacement relative thereto.

9. The reconfigurable system as recited in claim 8, wherein one of said first section and said holder portion is formed with at least one retention slot, and the other of said first section and said holder portion is formed with at least one cross member extending transversely thereacross to lockingly engage the retention slot when said holder portion is coupled to the attachment end of said first section.

10. The reconfigurable system as recited in claim 1, wherein said base portion includes a bottom surface having an access opening formed therethrough to communicate with the internal bore, the access opening being less in diametric extent than the internal bore.

11. The reconfigurable system as recited in claim 1, wherein the plurality of said modular holder structures include for alternative coupling to said frame portion individually or in combination: a planar table platform, an adjustable mobile device mount, a bounded tray, a body having at least one retaining ring, a body having at least one retaining recess, a clipping structure, and a body defining an internal compartment.

12. A reconfigurable system providing adjustable support for a personal article of a user in a manner releasably anchored to a built in cup holder receptacle onboard a vehicle, comprising:
    a base portion configured to substantially fill and maintain self-retaining fit within the cup holder receptacle during use, said base portion including an integrally formed body having a generally cylindrical outer surface tapered to extend conically downward, said base portion being thereby configured to substantially fill the cup holder receptacle with said generally cylindrical and conically tapered outer surface engaging an inner surface of the cup holder receptacle, the body of said base portion having an internal bore extending axially therein from an upper opening, said base portion including a resilient ring extending annularly about an intermediate part of the body for frictional capture between the body and the inner surface of the cup holder;

a frame portion engaging the internal bore of said base portion to extend longitudinally upward therefrom, said frame portion including a cylindrical stem member and at least one cylindrical extension member telescopically coupled thereto for both rotational and axial relative displacement, said stem and extension members being mutually locked against angular displacement at different axial positions relative to one another during use, said extension member defining an attachment end; and a holder portion coupled to the attachment end of said frame portion, said holder portion including a table platform defining a planar support plate surface and a plurality of mounts for the personal article, at least one of said mounts being coupled adjacent a periphery of said table platform and extending transversely therefrom in cantilevered manner for reinforcing the self-retaining fit of said base portion within the cup holder receptacle;

wherein said holder portion is selected from a plurality of modular holder structures having different structural configurations for holding personal articles of different type; and, the plurality of said modular holder structures include for alternative coupling to said frame portion individually or in combination: a planar table platform, an adjustable mobile device mount, a bounded tray, a body having at least one retaining ring, a body having at least one retaining recess, a clipping structure, and a body defining an internal compartment.

13. The reconfigurable system as recited in claim 12, wherein said base portion includes a bottom surface having an access opening formed therethrough to communicate with the internal bore, the access opening being less in diametric extent than the internal bore.

14. The reconfigurable system as recited in claim 12, wherein said frame portion includes a plurality of said extension members intercoupled to extend transversely from said stem member and laterally offset the attachment end from the insertion end of said stem member, said frame portion thereby maintaining a cantilevered bias force upon said base portion when received in the cup holder receptacle.

* * * * *